United States Patent

[11] 3,579,218

| | | | | |
|---|---|---|---|---|
| [72] | Inventor | Arthur M. Forsythe, Jr.<br>Shelburne, Vt. | | |
| [21] | Appl. No. | 757,375 | | |
| [22] | Filed | Sept. 4, 1968 | | |
| [45] | Patented | May 18, 1971 | | |
| [73] | Assignee | Simmonds Precision Products, Inc.<br>Tarrytown, N.Y. | | |

[54] ATTITUDE ERROR DETECTION FLUID GAUGING SYSTEM WITHOUT CORRECTION
5 Claims, 1 Drawing Fig.

[52] U.S. Cl................................................. 340/253,
340/27
[51] Int. Cl............................................... G08b 21/00
[50] Field of Search........................................ 340/253;
73/27, 304

[56] References Cited
UNITED STATES PATENTS

| | | | |
|---|---|---|---|
| 3,439,321 | 4/1969 | Sebern .......................... | 340/253X |
| 3,463,980 | 8/1969 | Cohn et al. .................... | 73/304X |

Primary Examiner—John W. Caldwell
Assistant Examiner—Daniel Myer
Attorney—Edwin E. Greigg ABSTRACT: An aircraft fuel gauging system which is coupled to a standard mass fuel gauge and accepts signals from the aircraft pitch and roll sensors to produce an output signal which indicates whether or not the mass fuel gauge can be accurately read. The output signal may be used to actuate a warning signal flag or a red light at the fuel indicators to signal the pilot that the indicator is unreliable and that the aircraft attitude must be changed to obtain an accurate fuel reading.

PATENTED MAY 18 1971      3,579,218
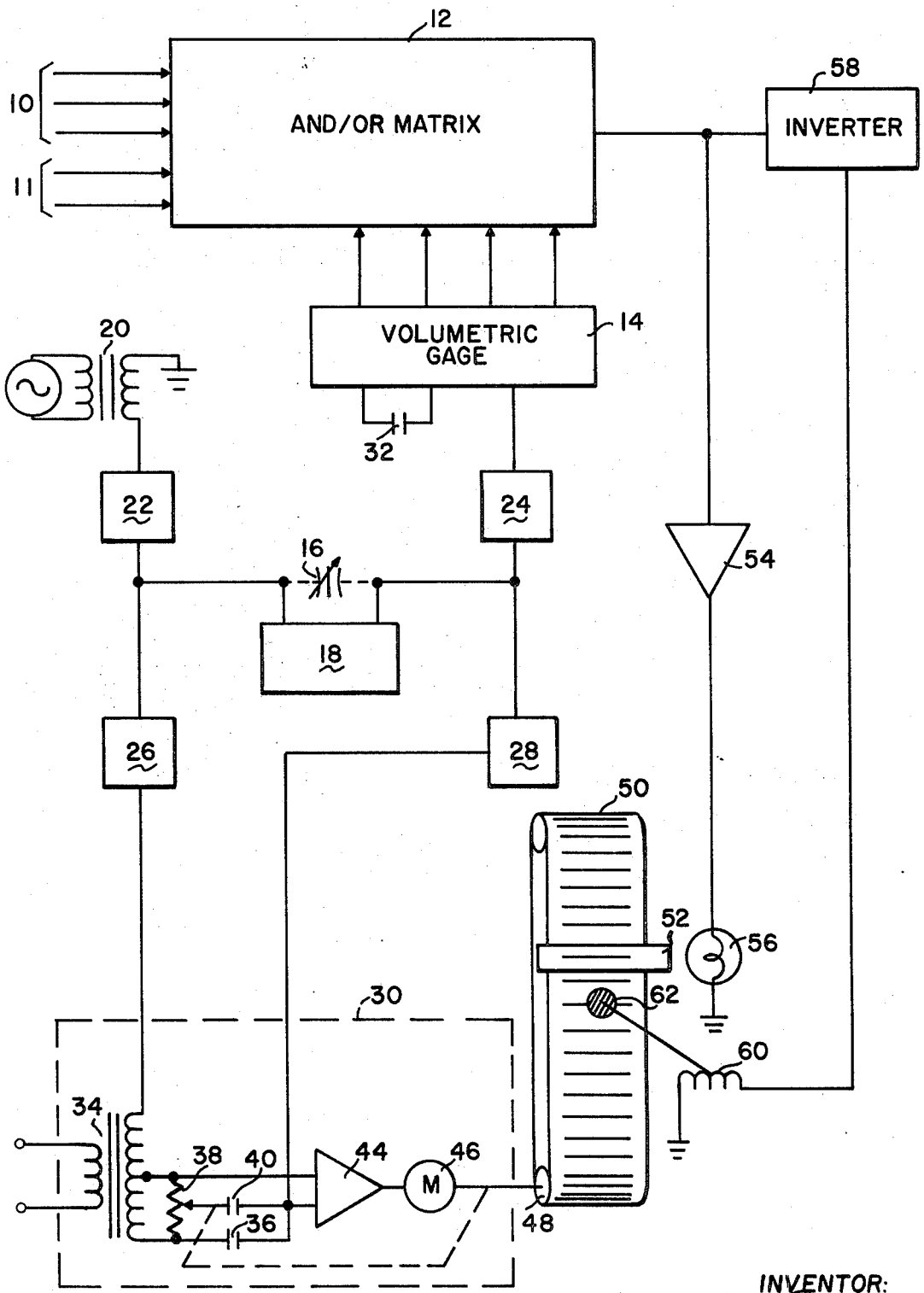
INVENTOR:
Arthur M. Forsythe, Jr.
BY
Edwin E. Greigg
ATTORNEY

ATTITUDE ERROR DETECTION FLUID GAUGING SYSTEM WITHOUT CORRECTION

CROSS-REFERENCE TO RELATED APPLICATIONS

The invention disclosed herein is related to copending application Ser. No. 589,631 filed Oct. 26, 1966 for an Attitude Error Correction Fluid Gauging System, which application issued on Aug. 26, 1969, as U.S. Pat. No. 3,463,980. Said patent describes an error correcting system for use with a standard mass fuel gauge. In that system, signals are generated which insert correcting values straight to the gauging system to cancel errors caused by attitude variations of the aircraft. The fuel indicators will thus produce reliable readings at any attitude.

The present invention is much less complex than that described in the copending application. The present invention provides means which will indicate when the fuel indicators are accurate or whether the aircraft attitude will cause an unreliable reading.

BACKGROUND OF THE INVENTION

The absence of adequate accuracy of aircraft fuel indicators has always been a constant and serious concern to the aircraft industry. In modern fuel gauging systems, the sensing system is designed to minimize errors due to the aircraft pitch and roll attitudes. Generally, the sensing systems currently in use consist of an appreciable number of capacitance sensing elements distributed in the fluid container, or tank, which is usually of an irregular shape. These sensing elements are then profiled, that is, their respective capacitances are varied with the height of the container in order to provide a current for a servo bridge indicator circuit which is linear with either volume or mass, as desired. Further, in addition to profiling the sensors they also are selectively placed within the tank in order to minimize as much as possible the variations caused by attitude changes of the aircraft.

Profiling of the capacitance sensors is normally determined by means of computer studies which optimize the capacitance probe sensors at the required attitudes of the aircraft, and one of the results of such computer studies is a series of listings of the calculated error at each fluid height and each required aircraft attitude. Experience has shown that the actual error in measurement obtained during testing with aircraft closely follows that which was predicted by the computerized results. The present invention uses these error tabulations together with pitch and yaw information from the aircraft attitude sensors, to provide at the fuel indicators, a signal or warning flag that indicates whether or not the fuel indicators are accurate at that particular aircraft attitude. With the advantage of such an attitude error detection system, a much smaller number of capacitance sensing probes may be employed than that number ordinarily used with a standard fuel gauging system in given container.

SUMMARY OF THE INVENTION

The present error signaling system operates as an accessory to existing fuel gauging systems and no way affects their accuracy or reliability. The signaling system receives pitch and roll signals from the aircraft attitude sensors and combines them with mass fuel gauge signals indicating the fuel level uncorrected for attitude. With the previous knowledge of actual errors obtained from the computer studies, the system provides output signals when the attitude is such that the fuel gauge is inaccurate. These signals may then be used to excite a warning lamp or a flag warning device near the aircraft fuel indicators.

In the drawings which illustrate an embodiment of the invention there is shown a single schematic diagram illustrating the concept of this invention. Referring now to the drawings, input lines 10 and 11 transmit signals representing pitch and roll angles, respectively, into the AND/OR matrix 12. For the purpose of this application pitch and roll attitudes are understood to be the attitude of the fuel surface. For example, the aircraft may remain in level flight but the fuel surface pitch may be varied by aircraft accelerations. Similarly, the aircraft may be in a roll attitude, by if the roll is the proper angle of bank in a coordinated turn, the fuel surface roll attitude maybe zero. These attitude signals are then transmitted across input lines 10 and 11 into matrix 12. Simultaneously, the fuel volume input signals are introduced into the matrix 12 from a volumetric gauge 14 which shares the capacitance tank sensor 16 in a tank 18 with a standard mass fuel gauge 30. Mass fuel gauge 30 forms no part of the invention but will be described briefly for the purpose of providing a better understanding of the invention.

Mass fuel gauge 30 is a servo capacitance bridge and comprises as the legs of the bridge, the secondary winding of transformer 34, the capacitance tank sensor 16 and capacitance 36. In the drawing, capacitor 16 is shown across the terminals of fuel tank 18. This is for illustration purposes since the capacitor 16 may comprise several separate capacitors within tank 18 where their capacitance is varied according to the fuel level in tank 18. Amplifier 44 senses an unbalance between capacitances 16 and 36. Thus, when the volume of fuel in tank 18 is changed, tank sensor 16 changes capacitance and the bridge becomes unbalanced so that the unbalanced or error signal is applied to amplifier 44 which, in turn, excites motor 46 which is mechanically connected to the rotor of potentiometer 38 as indicated by the dash lines in FIG. 1. The rotor of potentiometer 38 is in series with a rebalancing capacitance 40 which is in parallel with capacitance 36, so that movement of the potentiometer 38 will add the effect of capacitor 40 to the circuit to balance the bridge. As motor 46 continuously rebalances the bridge in accordance with the capacitance measurement sensed by tank sensor 16, the motor 46 will also actuate the fuel indicator which is shown herein as a roller 48 and endless belt type of gauge 50 which is moved relative to an index 52.

The tank sensing capacitor 16, which is shown in the figure to be across the terminals of the fuel tank 18, is shared with the mass gauge 30 as well as the volumetric gauge 14. The volumetric gauge 14 is a bridge circuit similar to the mass gauge 30 but employing a volumetric compensator capacitor 32. A transformer 20 operating at 2,000 hertz supplies the voltage for the volumetric gauge 14. This signal is prevented from entering the standard mass fuel gauge 30, which itself operates at the frequency of 400 hertz, by the use of filters 22, 24, 26 and 28. Filters 22 and 24 are high pass filters which pass the 2,000 hertz signal from transformer 20, through the tank sensing capacitors 16, into the volumetric gauge 14. The 400 hertz signal generated for the standard mass fuel gauge 30 will not pass through filters 22 and 24 and thus affect the operation of the volumetric gauge 14. Similarly, filters 26 and 28 are low pass filters which permit the passage of the 400 hertz signal into the capacitance bridge circuit of the fuel gauge 30 and yet prevent the 2,000 hertz signal from transformer 20 from entering and affecting the mass fuel gauge 30. The system therefore is a frequency multiplexing system in which two separate circuits operating at separate frequencies use a single tank sensing capacitor 16.

Input signals to the matrix 12 combine pitch, roll, and fuel volume which can be shown from a preselected set of computed error curves to have associated there with a particular known error. When the computed error exceeds a predetermined value, thus indicating that the fuel gauge indicator 50 is providing an unreliable reading, the matrix 12 produces an error signal at its output. This error signal may be amplified at amplifier 54 and applied to an error signal lamp 56 which, positioned near the indicator index 52, will indicate that the fuel indicator gauge 50 is inaccurate and should not be relied upon. When the pilot of the aircraft has resumed a normal flight attitude and the matrix 12 senses that the computed error is below the predetermined value, the output signal from matrix 12 will cease and lamp 56 will be extinguished to indicate that the reading of gauge 50 is now reliable.

If desired, the output signal from matrix 12 may be inverted through an inverter 58 and applied to the excitation coil 60 of an error indicating flag 62. As a fail-safe feature of this embodiment, flag 62 is normally indicating that gauge error exists, as shown in the figure. Thus, when the matrix 12 provides an output signal indicating that such an error exists, this signal is inverted at inverter 58 so that no signal current appears in coil 60 and flag 62 remains in its normal position to indicate an error signal. On the other hand, if matrix 12 senses that there is no error in the fuel gauge reading, there will be no output signal from the matrix 12. This zero signal is inverted by inverter 58 to produce a current that actuates coil 60 and flag 62. Thus, flag 62 must be activated by the absence of an output signal from matrix 12.

It should be noted that the error detection system is added to the standard mass gauge 30 and that removal of, or failure of, any of the components will not affect the proper operation of the gauge 30.

I claim:

1. An error detection system for use with a capacitive liquid fuel tank sensor comprising in combination a mass fuel gauging system connected to said fuel tank sensor, said gauging system having a capacitance bridge, rebalancing servo means for rebalancing the bridge and fuel indicator means connected to said servo means, the capacitance of said liquid fuel tank forming one leg of said bridge so as to cause an unbalance thereof upon changes in fuel volume, volumetric gauge means connected to said capacitive liquid fuel tank sensor for providing a signal corresponding to volume of fuel in the tank, matrix means connected to receive said signal together with other signals corresponding to attitude of the fuel surface, said matrix means being adapted to combine said attitude and volume signals and effect a comparison thereof with a preselected error curve and provide an output signal corresponding to an unreliable indication by said fuel indicator means and means responsive to said output signal for controlling an error warning means.

2. An error detection system as set forth in claim 5, wherein said error warning means is a signal lamp.

3. An error detection system as set forth in claim 5, wherein said error warning means includes an error flag signal.

4. An error detection system as set forth in claim 1, wherein said means responsive to said output signal includes an inverter and said error indicating means a solenoid actuated signal means having an error flag positioned adjacent said fuel indicator means, said error flag being visually displayed when said solenoid actuated signal means is deenergized.

5. An error detection system as set forth in claim 4, wherein said means responsive to said output signal further includes an amplifier and said error indicating means further includes a signal lamp connected to said amplifier.